Sept. 24, 1963     E. L. RACKLEFF     3,104,647
TEAT CUP FOR MILKING MACHINE
Filed Jan. 8, 1960
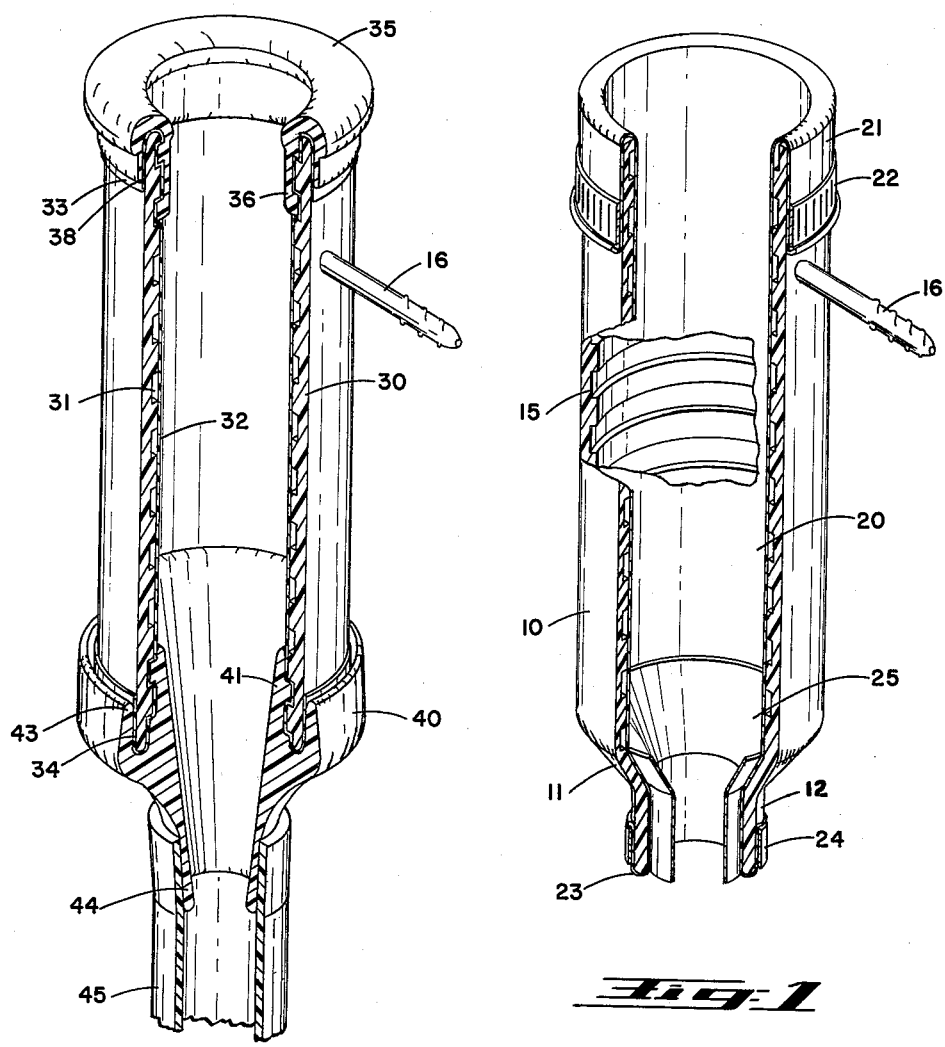
INVENTOR.
ELLIS L. RACKLEFF
BY
ATTORNEY United States Patent Office  
3,104,647  
Patented Sept. 24, 1963

3,104,647  
TEAT CUP FOR MILKING MACHINE  
Ellis L. Rackleff, P.O. Box 101, Eugene, Oreg.  
Filed Jan. 8, 1960, Ser. No. 1,237  
5 Claims. (Cl. 119—49)

This invention relates to improvements in teat cups for mechanical milking machines.

Such teat cups consist essentially of two parts, one being a rigid shell or holder which will not collapse under atmospheric pressure when suction is applied within and the other part comprising a flexible and elastic rubber liner which is adapted to contract and exert a squeezing action on a teat inserted therewithin when air pressure is introduced between the liner and the shell.

One of the principal problems involved in the design and use of teat cups is that of sanitation. It has been the practice heretofore to make the rubber liners of relatively heavy material which could be washed and sterilized repeatedly without too rapid deterioration. Nevertheless, the washing and sterilization of the liners after each use does deteriorate them quite rapidly thereby entailing considerable expense in replacement. Perhaps equally important as an item of expense is the cost of the washing and sterilizing operation itself involving the daily handling of large quantities of liners and the precautions necessary to avoid contamination of the liners after they have been sterilized.

The general object of the present invention is, therefore, to eliminate the whole problem of washing and sterilizing teat cup liners by providing inexpensive, disposable liners which may economically be discarded after a single use.

Other objects are to provide an improved teat cup, to provide an improved form of disposable liner and to provide improved means for securing a disposable liner in a teat cup for convenient application and removal of the liner from the cup.

In general, the invention involves the provision of a relatively thin and inexpensive natural or synthetic rubber liner of the approximate thickness of a toy balloon. Improved fastening and retaining means are furnished and the interior wall of the teat cup is provided with a spiral groove so that at the commencement of the squeezing action the air pressure in the teat cup will be applied first to the upper portion of the teat after which the squeezing pressure will progress downwardly to simulate the approved technique of hand milking.

The foregoing and other objects and advantages will become apparent and the invention will be better understood from the following description of a preferred embodiment of the invention illustrated on the accompanying drawing. Various changes may be made, however, in the details of construction and arrangement of parts and all such modifications within the scope of the appended claims are included in the invention.

In the drawings:

FIGURE 1 is a cutaway view of a teat cup embodying the principles of the present invention, showing portions of the shell and liner in section; and FIGURE 2 is a similar view of a modification.

The shell 10 in FIGURE 1 is a rigid tubular body of plastic or metal having a conically tapered lower end portion 11 terminating in a reduced cylindrical neck 12. The interior surface of the upper large cylindrical portion of the shell is provided with a relatively wide spiral groove 15 extending the whole length of said main cylindrical portion. Groove 15 permits a core member to be removed by unscrewing when the shell is molded from plastic material. Communicating with the groove 15 near its upper end is a nipple 16 for connection with a vacuum hose leading to a pulsating pump.

Within the rigid shell 10 is a disposable thin rubber liner 20 having a reduced lower end portion of approximately the same shape and diametral dimensions as the inside of shell 10. The liner 20, however, is somewhat longer than shell 10 to provide excess length at the top which may be folded back over the outside of the shell, as indicated at 21, and secured by a suitable clamp ring 22. Similarly, at the reduced lower end an excess length of the liner material is folded back at 23 over the lower end of the shell and secured by a suitable ring clamp 24. Thus, both ends of the shell are enclosed and encased in portions of the reversely folded liner whereby the shell does not have to be washed and sterilized at frequent intervals.

The numeral 25 designates a rigid insert having an upper flared end of conical shape and a lower reduced cylindrical end to fit within the liner and prevent collapse of the lower end thereof when air pressure is introduced into the groove 15 surrounding the liner. This insert conforms to the shape of the lower end of the shell and is preferably made of an inexpensive plastic material so as to be disposable along with the liner 20 after each use.

As will be understood by persons skilled in the art, the lower end of the shell is connected in the usual way with a milk tube connected with a source of steady suction. Such suction is applied to the opening in the end of the teat to withdraw the milk when the teat is inserted in the teat cup. When pulsating suction is applied to the exterior surface of the flexible liner, the teat is squeezed and released alternately in a rhythmic action to perform the milking operation.

During the suction phase of the cycle at nipple 16, air is withdrawn from the groove 15, releasing the pressure on the teat and drawing the liner away from the teat and into engagement with the lands between the turns of the groove. Then, during the pressure phase of the cycle, air is introduced through nipple 16 near the upper end of spiral groove 15, from whence it flows around the groove toward the lower end of the groove. Thus, the returning air pressure is applied first to upper portions of the teat to exert a squeezing action thereon before the pressure builds up at the lower end of groove 15 to squeeze the lower portions of the teat. This downward squeezing motion produces an ideal milking action for faster milking and better stripping which is advantageous to the operator and beneficial to the animals. Insert 25 prevents any squeezing action on the very end of the teat. After each milking, the liner 20 and insert 25 are discarded, thereby eliminating the liner washing and sterilizing operations and most of the handling problem in connection with the use of teat cup liners.

The shell 30 in FIGURE 2 is cylindrical without any taper or reduction at the lower end. Internal spiral groove 31 is continuous from one end of the shell to the other, permitting a core member to be withdrawn from the shell by unscrewing when the shell is molded from a plastic material. Nipple 16 communicates with groove 31 at a point near the upper end of the shell as in FIGURE 1.

Disposable liner 32 is a cylindrical tube of thin resilient rubber having sufficient excess length to allow the upper and lower ends 33 and 34 to be folded back over the ends of the shell as shown. The upper end of the liner is secured by a nut-type cap 35 of polyethylene plastic or other suitable material which may be sterilized and reused. The upper end surface of cap 35 provides a sufficiently wide base surface in contact with the animal's udder to prevent the shell from creeping up and exerting undesirable concentrated pressure against the udder in a limited area.

Cap 35 has an inside flange 36 equipped with a screw thread which fits loosely in the spiral groove 31 so that the cap may be screwed into the end of shell 30 over the liner as shown without damaging the liner. There is sufficient clearance between the thread on flange 36 and groove 31 to accommodate the thickness of the liner. Polyethylene material has a self-lubricating quality which makes it well suited for such an application. Cap 35 is further equipped with an outer flange 38 to cover the down-folded outer end 33 of the liner.

Similarly, the lower end of the shell is equipped with a nut-type cap 40 having an inner annular flange 41 provided with a thread to screw in the spiral groove 31 and clamp the lower end of the liner to the shell. An outer annular flange 43 overlies the up-folded end 34 of the liner and a depending nipple extension 44 provides connection with the conventional suction and milk tube 45. Inner flange 41 thus holds the lower end of the liner against the inner wall of the shell 30 and prevents collapse of the liner against the lower end of the teat when air pressure is introduced through nipple 16 between the liner and shell. Cap nut 40 is preferably made of the same material as cap 35 for sterilization and re-use.

The sterilization and handling of caps 35 and 40 do not present the problem and expense involved in sterilizing and re-using liners whereby the modification in FIGURE 2 effects considerable advantage over conventional teat cups equipped with re-usable liners. Many of the features of the invention may be employed, however, with re-usable liners, if desired.

Having now described my invention and in what manner the same may be used, what I claim as new and desire to protect by Letters Patent is:

1. A teat cup comprising a rigid tubular shell provided with a spiral groove on its inner surface forming a continuous screw thread extending to the upper end of the shell, a hollow nipple mounted on an upper portion of said shell in direct communication with said groove, a thin disposable rubber liner in said shell with smooth inner and outer surfaces, and a tapered spreader extending within said liner in the lower end of said shell holding said liner outwardly against said shell to prevent inward collapse of the lower end portion of said liner.

2. A teat cup comprising a rigid cylindrical shell having a tapered lower end portion terminating in a reduced cylindrical extremity, said shell being provided with a spiral groove in its inner surface extending substantially the full length of the shell above said tapered portion, said groove forming a continuous screw thread extending to the upper end of the shell, a hollow nipple on said shell communicating directly with an upper portion of said groove, a thin disposable liner in said shell having upper and lower end portions turned back over the outside of said shell, clamp rings securing said turned back portions of said liner on said shell, and a tapered rigid insert in the lower end of said liner holding said liner against said tapered portion of said shell to prevent inward collapse of the lower end portion of the liner.

3. A teat cup comprising a tubular shell having an internal spiral groove forming a continuous screw thread extending to both ends of the shell, a hollow nipple mounted on an upper portion of said shell in direct communication with said groove, a flexible tubular liner in said shell, and top and bottom end caps having threaded engagement in said groove and clamping end portions of said liner therein.

4. A teat cup comprising a rigid cylindrical shell of uniform diameter throughout its length and provided with a spiral groove on its inner surface forming a continuous screw thread extending to both ends of the shell, a nipple mounted on an upper portion of said shell in direct communication with said groove, a thin disposable cylindrical rubber liner in said shell of uniform diameter and greater length than said shell, said liner having end portions turned back over the outside of said shell, top and bottom caps on said shell having outer annular flanges overlying said turned back end portions of said liner and having inner annular flanges threaded into said groove with said liner disposed between said caps and said shell, and a nipple extension on said bottom cap for connection with a milk tube.

5. A teat cup for use with a disposable liner comprising a rigid cylindrical shell of uniform diameter and having a spiral groove on its inner surface forming a continuous screw thread extending to both ends of the shell, and top and bottom liner clamping caps for said shell, said caps having portions with external threads to screw in said spiral groove, said threads having a sufficiently loose fit in said groove to receive said liner therebetween.

References Cited in the file of this patent
UNITED STATES PATENTS

| | | |
|---|---|---|
| 1,072,584 | Dinesen | Sept. 9, 1913 |
| 1,353,570 | Dinesen | Sept. 21, 1920 |
| 1,388,380 | Schmitt | Aug. 23, 1921 |
| 1,657,667 | Ellison | Jan. 31, 1928 |